United States Patent
Williams

(10) Patent No.: US 8,960,261 B1
(45) Date of Patent: Feb. 24, 2015

(54) VEHICLE WINDOW SHADE SYSTEM

(71) Applicant: Terile Williams, Tucson, AZ (US)

(72) Inventor: Terile Williams, Tucson, AZ (US)

( * ) Notice: Subject to any disclaimer, the term of this patent is extended or adjusted under 35 U.S.C. 154(b) by 0 days.

(21) Appl. No.: 14/189,535

(22) Filed: Feb. 25, 2014

Related U.S. Application Data

(60) Provisional application No. 61/769,574, filed on Feb. 26, 2013.

(51) Int. Cl.
*B60J 3/02* (2006.01)
*B60J 1/20* (2006.01)

(52) U.S. Cl.
CPC ................... *B60J 1/2025* (2013.01)
USPC ................... 160/370.22; 296/97.8

(58) Field of Classification Search
USPC ........... 160/370.22, 243, 263, 274; 296/97.8
See application file for complete search history.

(56) References Cited

U.S. PATENT DOCUMENTS

| | | | | |
|---|---|---|---|---|
| 4,874,026 A | * | 10/1989 | Worrall | 160/23.1 |
| 5,404,926 A | * | 4/1995 | Ojima et al. | 160/280 |
| 5,560,668 A | * | 10/1996 | Li | 296/97.8 |
| 6,095,231 A | * | 8/2000 | Hahn | 160/370.22 |

* cited by examiner

*Primary Examiner* — Blair M Johnson

(57) ABSTRACT

A vehicle window shade system for providing shade to the interior of a vehicle. A first guide rail and a second guide rail are attached to a vehicle window frame. The shade is supported by a top support bar and a bottom support bar. At least a part of the top support bar and/or the bottom support bar is made from elastic materials or telescoping parts such that the support bars may be extended to reach the varying distances between the first side rail and the second side rail. The shade expands by pressing a switch that triggers a motor to uncoil a cable and move the top support bar up the first and second guide rails.

2 Claims, 8 Drawing Sheets

VEHICLE WINDOW SHADE SYSTEM

CROSS REFERENCE

This application claims priority to U.S. Provisional Patent Application No. 61/769,574, filed Feb. 26, 2013, the specification(s) of which is/are incorporated herein in their entirety by reference.

SUMMARY OF THE INVENTION

The present invention features a vehicle window shade system inside a vehicle. The system includes shade subsystems for a front wind shield, a front driver side window, a front passenger side window, a rear driver side window, a rear passenger side window, and/or a rear wind shield. Each shade subsystems comprises a first guide rail, a second guide rail, a shade, a controller switch, and at least one motor. The shade is supported by a top support bar and a bottom support bar. At least a part of the top support bar and/or the bottom support bar is made from elastic materials or telescoping parts such that the support bars may be extended to reach the varying distances between the first side rail and the second side rail.

DESCRIPTION OF PREFERRED EMBODIMENTS

Figure 1:
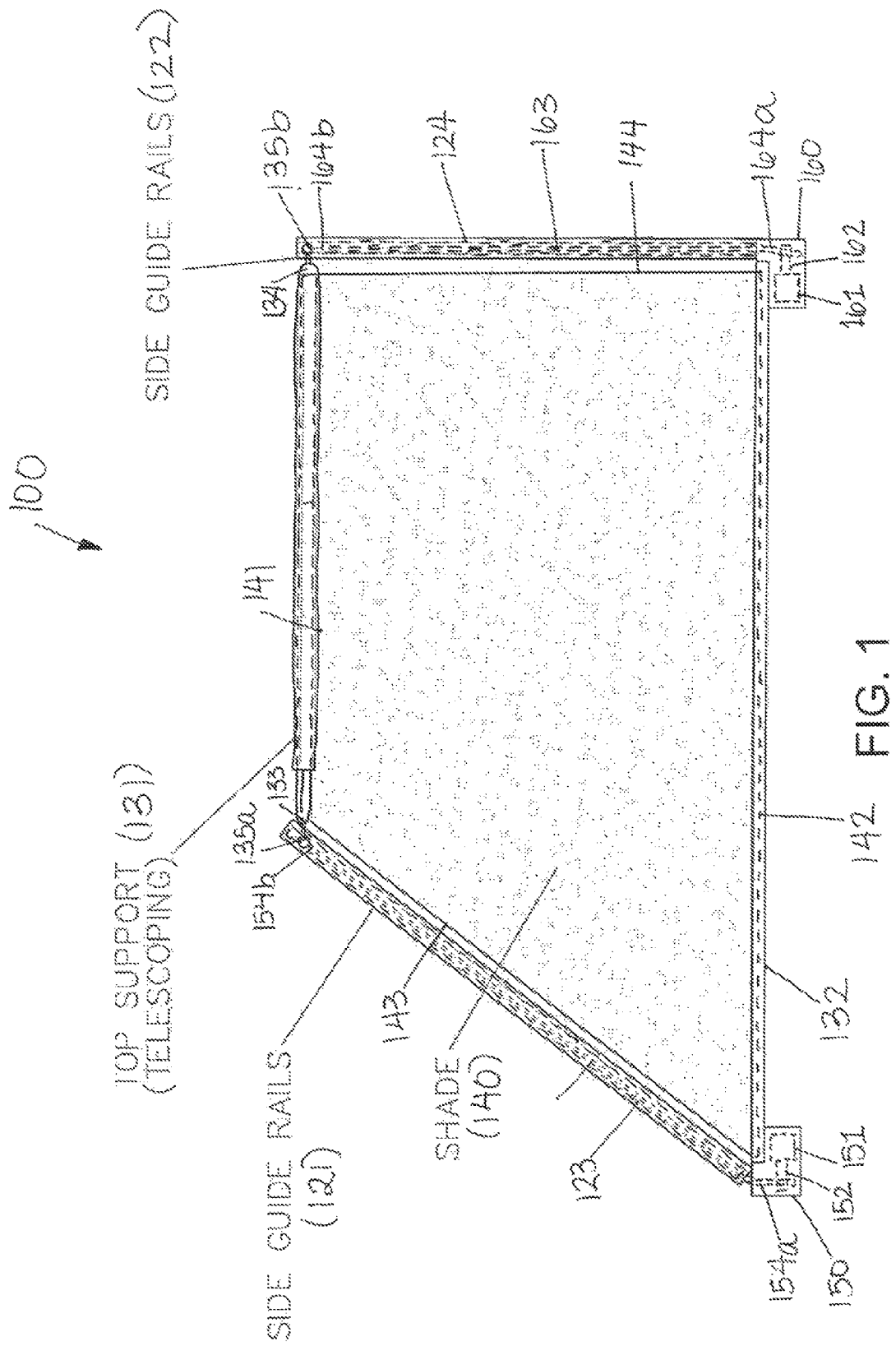
FIG. 1 shows a front view of the vehicle window shade system with the shade completely covering a vehicle window.
Figure 2:
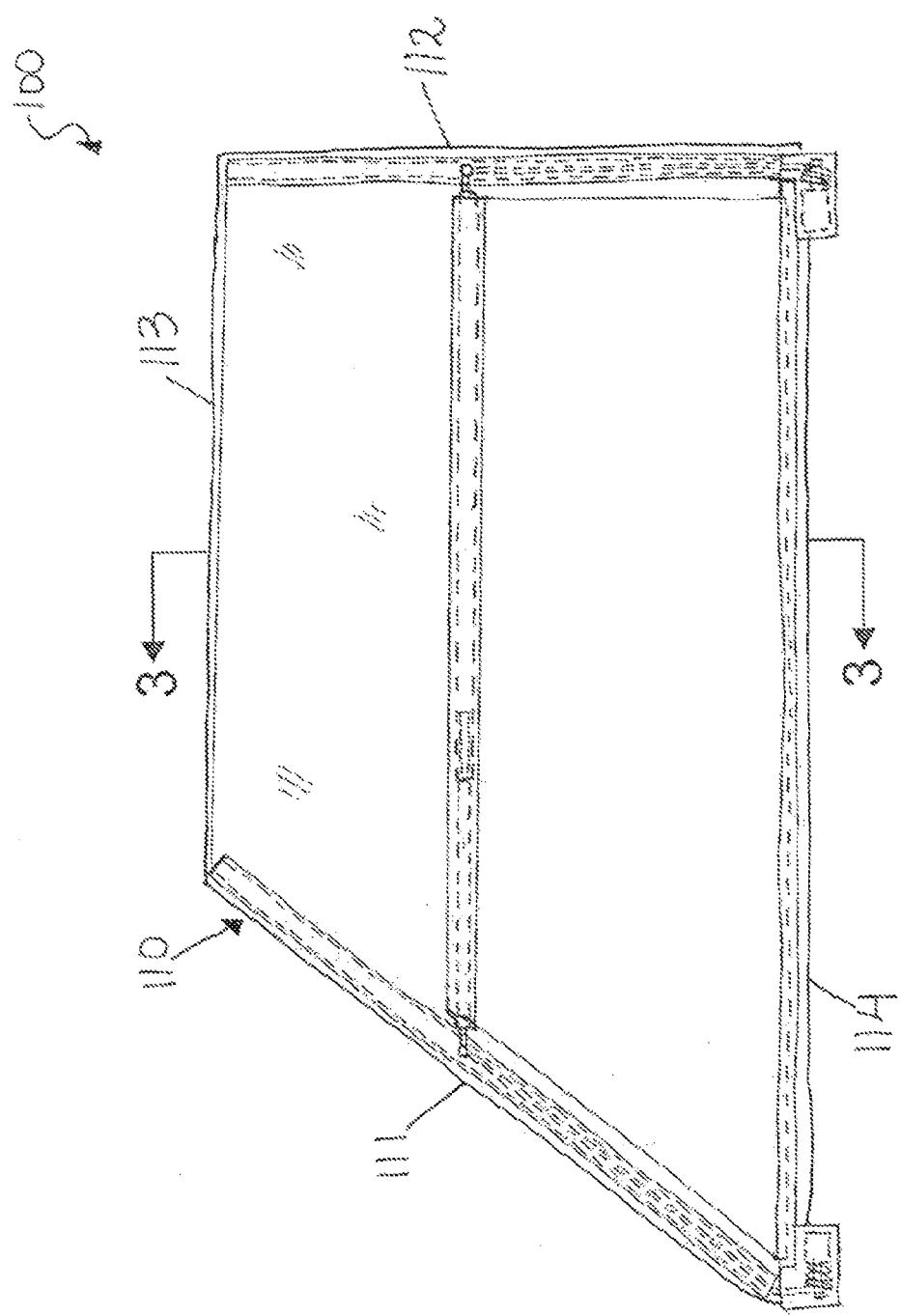
FIG. 2 shows a front view of the vehicle window shade system with the shade partially covering the vehicle window.
Figure 3:
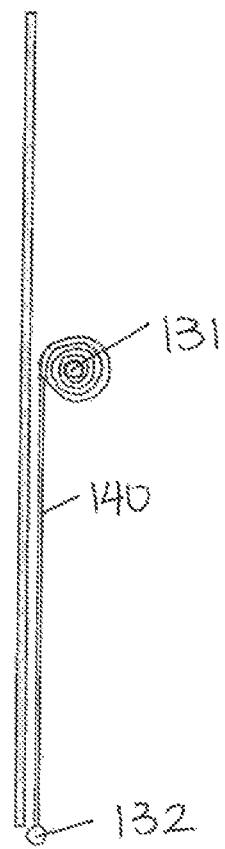
FIG. 3 shows a cross-sectional view of FIG. 2
Figure 4:
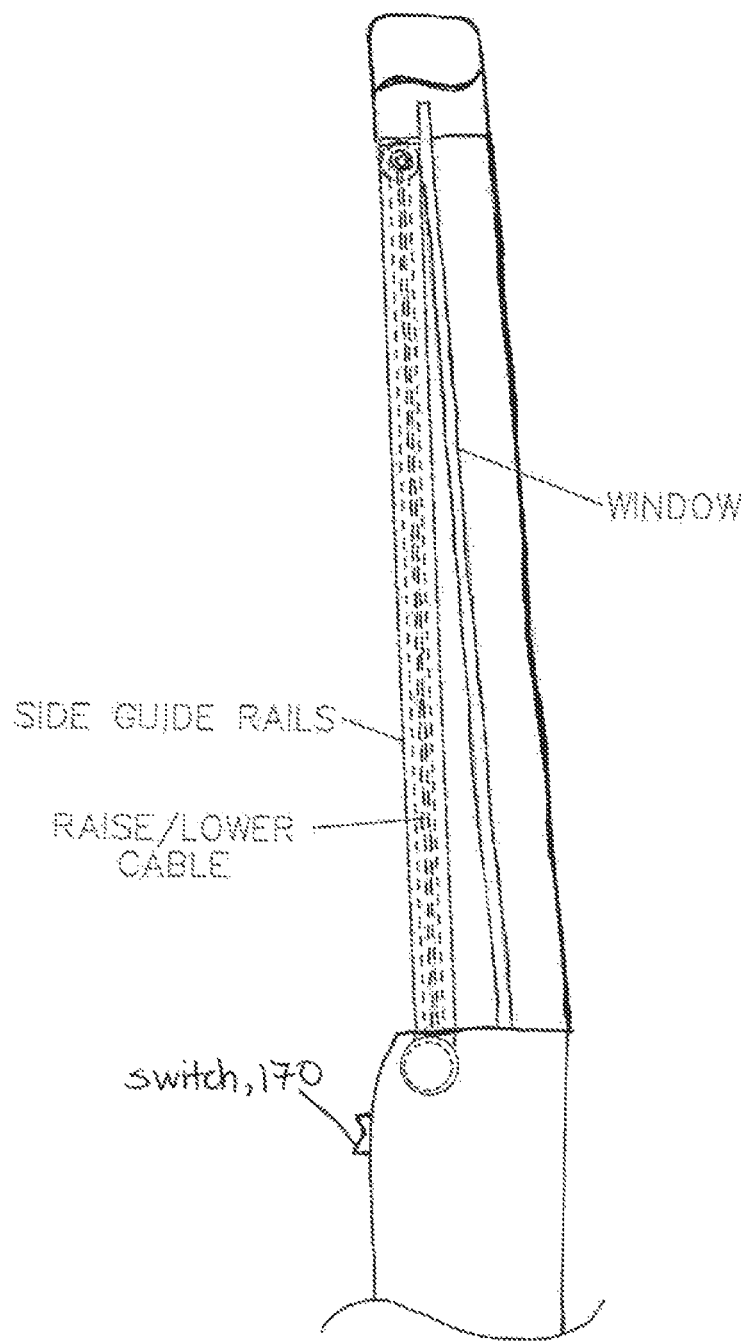
FIG. 4 shows a side view of the vehicle window shade system.
Figure 5:
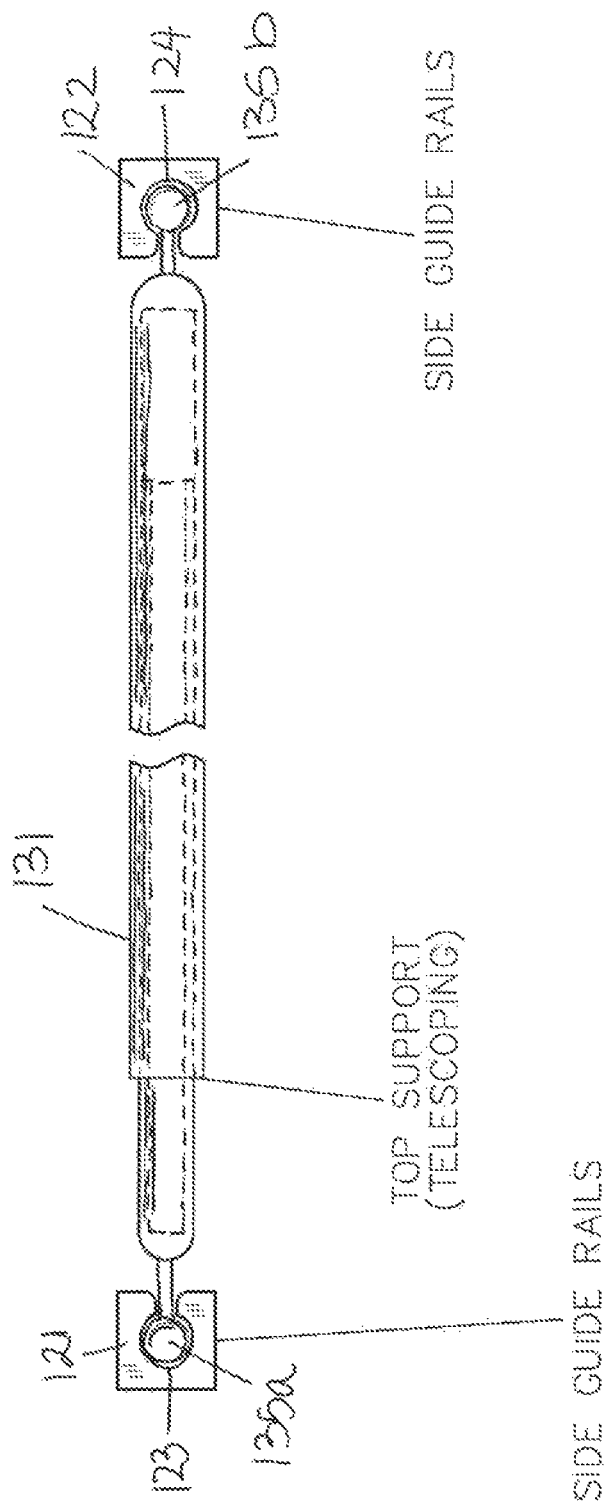
FIG. 5 shows a top view of the vehicle window shade system.
Figure 6:
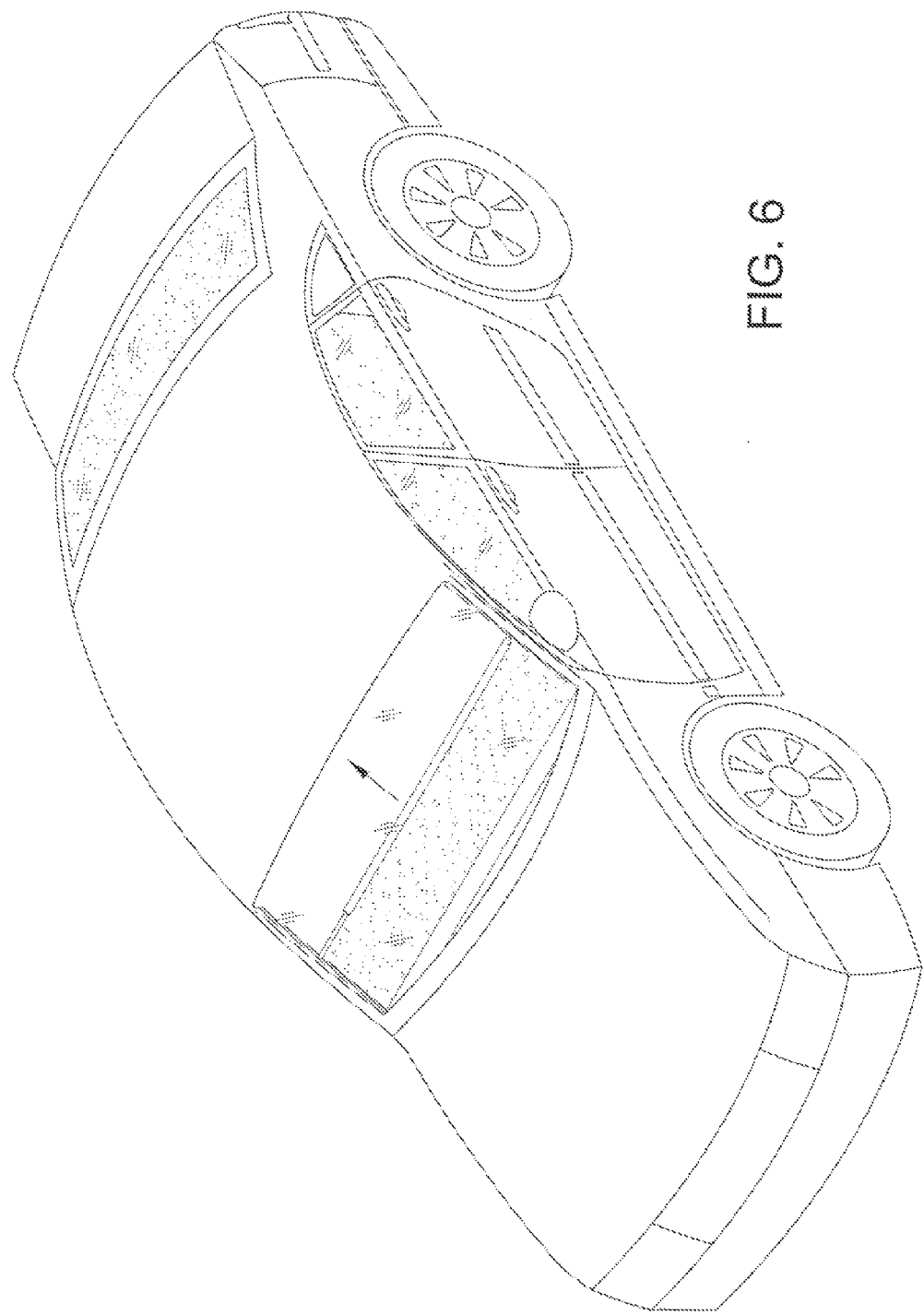
FIG. 6 shows a perspective view of a vehicle wherein the vehicle window shade system is in-use.
Figure 7:
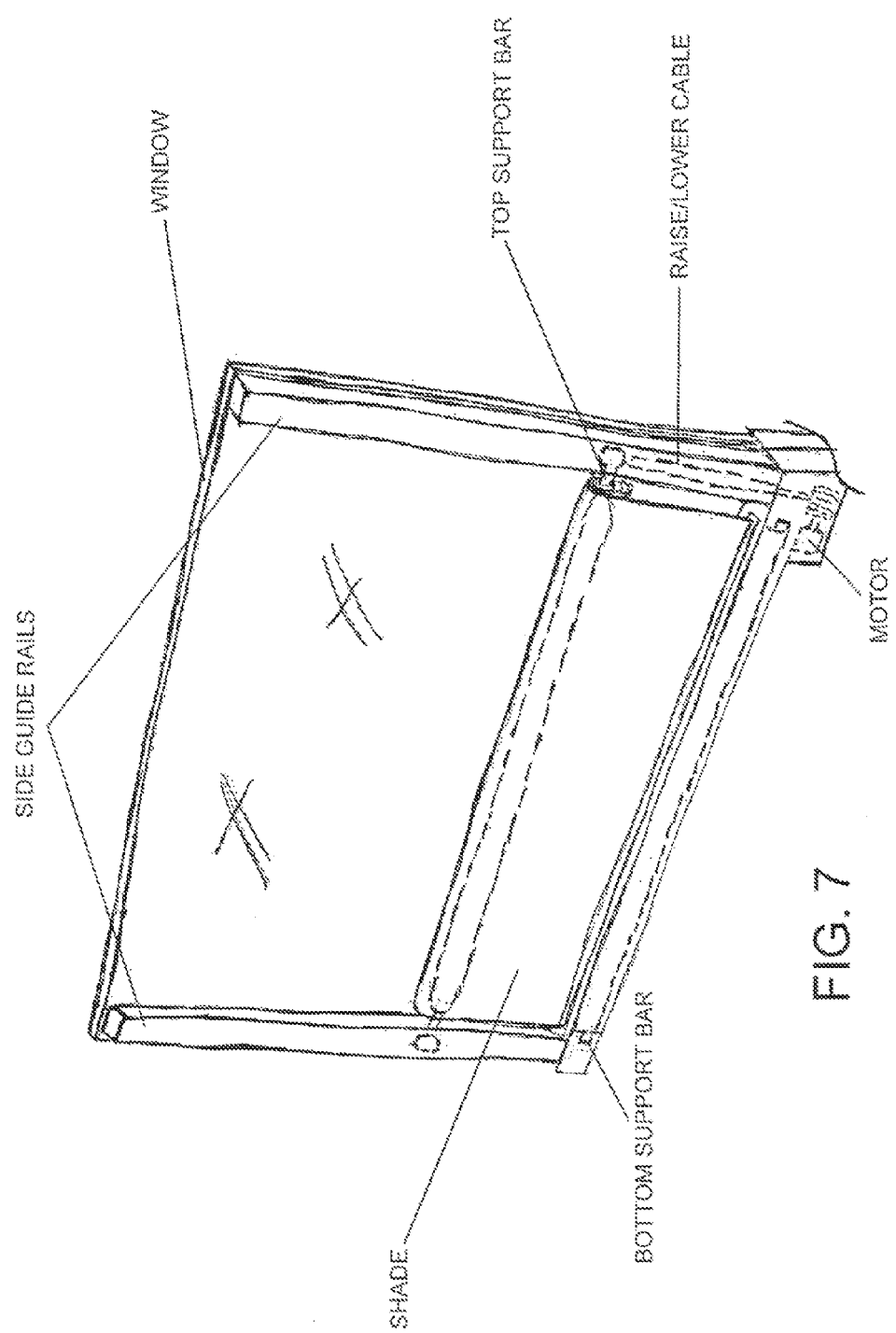
FIG. 7 shows a perspective front view of an alternative embodiment of the vehicle window shade system
Figure 8:
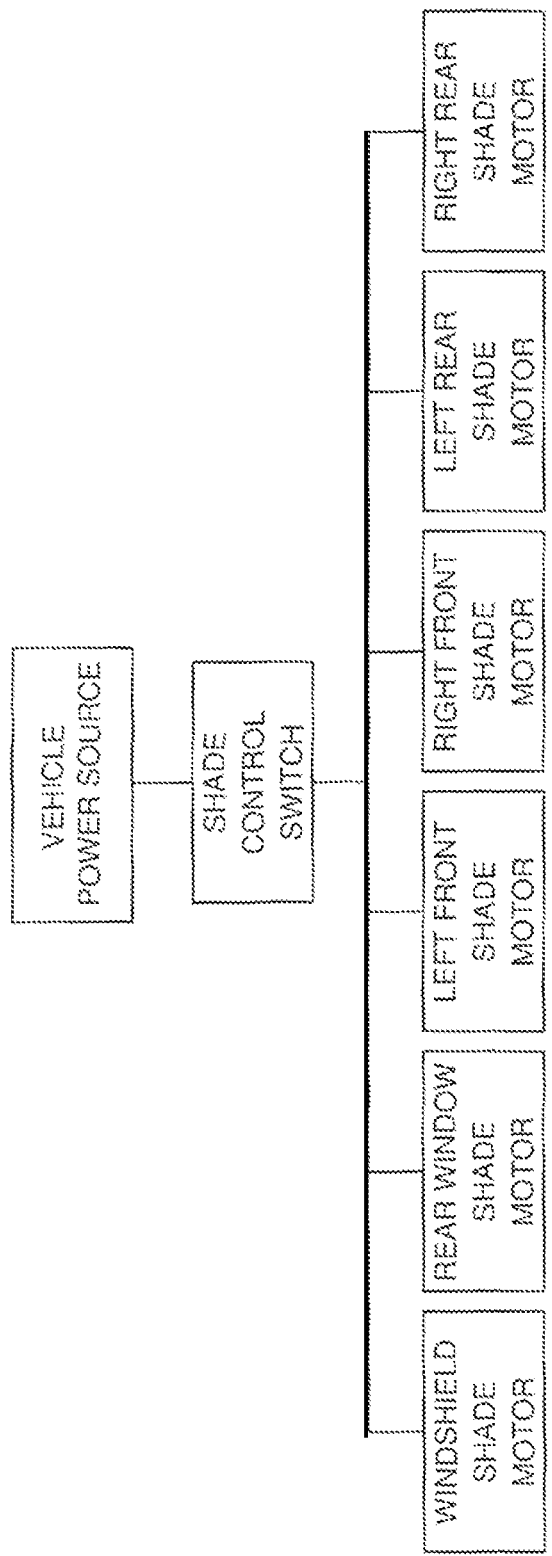
FIG. 8 is a block diagram of the electrical components of the vehicle window shade system.

Referring now to FIGS. 1-8, the present invention features a power shade system inside a vehicle.

The present invention features a vehicle window shade system (100), wherein the vehicle window shade system (100) comprises a vehicle window frame (110) having a first side (111), an opposing second side (112), a top side (113) and a bottom side (114), a first guide rail (121) attached to the frame first side (111) and a second guide rail (122) attached to the frame second side (112), and a first track (123) disposed along the first guide rail (121) and a second track (124) disposed along the second guide rail (122).

The vehicle window shade system (100) further comprises a telescoping top support bar (131) comprising a first track head (135*a*) disposed on a first bar end (133) and a second track head (135*b*) disposed on a second bar end (134), wherein the first track head (135*a*) is securely connected to the first track (123), and wherein the second track head (135*b*) is securely connected to the second track (124), and a bottom support bar (132) extending from the first guide rail (121) to the second guide rail (122).

The vehicle window shade system (100) further comprises a rollable shade (140) comprising a shade top edge (141), a shade bottom edge (142), a shade first side (143), and a shade second side (144), wherein the shade top edge (141) is attached to the telescoping top support bar (131), wherein the shade bottom edge (142) is attached to the bottom support bar (132), wherein the shade first side (143) is adjacent to the first guide rail (121) and the shade second side (144) is adjacent to the second guide rail (122), wherein the shade (140) is biased to coil around the telescoping top support bar (131).

The vehicle window shade system (100) further comprises a rotatable first spool (152) extending from a first motor (151) enclosed within a first motor housing (150), and a rotatable second spool (162) extending from second motor (161) enclosed within a second motor housing (160), a coilable first cable (153) having a first cable first end (154*a*) attached to the first track head (135*a*) and a first cable second end (154*b*) attached to the rotatable first spool (152), a coilable second cable (163) having a second cable first end (164*a*) attached to the second track head (135*b*) and a second cable second end (164*b*) attached to the rotatable second spool (162), and an up/down switch (170).

In some embodiments, when the switch (170) is triggered to move the shade (140) in an upward motion, the first motor (151) rotates the first spool (152) and the second motor (161) rotates the second spool (162) such that the first cable (153) and the second cable (163) uncoil from the first spool (152) and the second spool (162) respectively, wherein the first cable (153) and second cable (163) extend upwardly to move the first track head (135*a*) and the second track head (135*b*) along the first track (123) and second track (124) respectively, and wherein the upward movement of the first track head (135*a*) and the second track head (135*b*) uncoils the rollable shade (140) from the telescoping top support bar (131).

In some embodiments, when the switch (170) is triggered to move the shade (140) in a downward motion, the first motor (151) rotates the first spool (152) and the second motor (161) rotates the second spool (162) such that the first cable (153) and the second cable (163) retract and coil around the first spool (152) and the second spool (162) respectively, wherein the first cable (153) and second cable (163) retract to move the first track head (135*a*) and the second track head (135*b*) downwardly along the first track (123) and second track (124) respectively, and wherein the downward movement of the first track head (135*a*) and the second track head (135*b*) coils the rollable shade (140) around the telescoping top support bar (131).

In some embodiments, the system includes a power shade subsystem for front wind shield and/or a power shade subsystem for front driver side window and/or a power shade subsystem for front passenger side window and/or a power shade subsystem for rear driver side window and/or a power shade subsystem for rear passenger side window and/or a power shade subsystem for rear wind shield.

In some embodiments, each power shade subsystem comprises a first side rail enclosing a first side bar, a second side rail enclosing a second side bar, a shade, a controller switch and at least one motor. The first rail and the second rail may be installed along A-pillars for the front wind shield, or along the window frame of the front/rear side doors, or along C-pillars/D-pillars of a vehicle. The vehicle is a sedan, coupe, wagon, SUV, truck or a minivan, etc. In some embodiments, the first rail is installed along a top side of the front wind shield and the second rail is installed along a bottom side of the front wind shield.

In some embodiments, the first and second side rails each have a column structure with an elongated cavity within the column. A first side bar and a second side bar are configured to reside within the cavity of the first side rail and second rail respectively. The first and second side rails each have a slot opening along the cavity within each rail. The slot of the first side rail faces the slot of the second side rail such that a shade is configured to be disposed between first side bar and the second side bar. The slots on the side rails are smaller than the side bars such that the side bars securely reside within the cavities of the side rails.

In some embodiments, the side bar has one side disposed with linear teeth to engage to a transfer gear, which is powered by a motor to rotate in dual-motion to move the side bar upwardly or downwardly. The second side bar is configured in a similar way. In some embodiments, both side bars move up or down by a single electric motor. In some embodiments, the first side bar and the second side bar move up or down by separate electric motors.

In some embodiments, the first side bar has a top end connected to a lower end through a first pull-up roller, a first transfer roller and a first drag roller. The first pull-up roller is disposed near a top end of the first side rail and the first drag roller is disposed near a bottom end of the first side rail. A motor powers the first drag roller in a dual motion to move the side bar upwardly or downwardly. The second side bar is configured in a similar way. In some embodiments, both side bars move up or down by a single electric motor.

In some embodiments, the first and second side rails are parallel to each other. In some embodiments, the first and second side rails are not parallel to each other, with at least one side rail is curved lengthwise. In some embodiments, the side bars are made of semi-rigid materials such that the side bars are flexible enough to move within the cavity of the curved side rail.

In some embodiments, the shade is supported by a top support bar and a bottom support bar. At least part of the top support bar and/or the bottom support bar are made from elastic materials such that the support bars may be extended to reach the varying distances between the first side rail and the second side rail.

In some embodiments, the shade is disposed between the first side bar and second side bar without the top support bar and bottom support bar. The shade is made of flexible materials such that the shade is adaptive for variable distance between the first side bar and second side bar when the shade is being lifted or lowered.

In some embodiments, each power shade subsystem comprises a first side rail enclosing a first side bar, a second side rail enclosing a first side bar, a shade, a controller switch and at least one motor. In some embodiments, there is one electric motor to control the lifting or lowering of both side bars. In some embodiments, there are two motors with each motor controlling the lifting or lowering of one side bar. The electric motor(s) is powered by vehicle power source via wire connections. A controller switch is configured to control the lifting or lowering of the side bars. The controller switch can be a two way switch, a rotary switch or a one-touch switch. Controller switches are well known to one of ordinary skill of the art. In some embodiments, the controller switch is operated manually. In some embodiments, the controller switch is operatively connected to a vehicle control computer for an automatic controlling the lifting or lowering of the shade according to sun light intensity or direction.

In some embodiments, the top support bar may be constructed of telescoping parts such that support bar can be lengthened or shortened to cover the varying distances between the first and second side rails. In some embodiments, the ends of the top support bar may be a bulbous shape such that it can nestle in the cavity of the first and second side rails. In some embodiments, the first and second side rails have a cylindrical cavity that extends throughout the length of the side rails to enclose the ends of the top support bar.

In some embodiments, when the shade is in a retracted position, the shade is coiled around the bottom support bar. In some embodiments, when the shade is in a retracted position, it is coiled around the top support bar. In some embodiments, at least one motor is inside a housing that is positioned below or at the ends of the bottom support bar. A spool is connected to one end of the motor. A cable is coiled around the spool with the loose end of the cable partially inside the cylindrical cavity of the side rail. When the shade is being lifted, the motor rotates the spool in a direction to unwind the cable from the spool. The unwound cable pushes into the cavity. The end of the cable pushes at the end of the top support bar and lifts the bar in an upward direction. The cable is semi-rigid so that it is has the flexibility to wind around the spool while also having the rigidity to lift the top support bar. In some embodiments, the cable is constructed from a metal. In some embodiments, the cable is made of steel cable.

In some embodiments, the shade is made from a material that will automatically coil around a support bar as it is being retracted. In some embodiments, the shade is constructed from shape-memory polyesters. In some embodiments, the shade is constructed from shape-memory textiles.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures.

The reference numbers recited in the below claims are solely for ease of examination of this patent application, and are exemplary, and are not intended in any way to limit the scope of the claims to the particular features having the corresponding reference numbers in the drawings.

What is claimed:
1. A vehicle window shade system (100) comprising:
 a) a vehicle window frame (110) comprising a first side (111), an opposing second side (112), a top side (113) and a bottom side (114);
 b) a first guide rail (121) attached to the frame first side (111) and a second guide rail (122) attached to the frame second side (112);
 c) a first track (123) having an elongated cavity disposed within the first guide rail (121) and a second track (124) having an elongated cavity disposed within the second guide rail (122);
 d) a telescoping top support bar (131) comprising a bulbous first track head (135a) disposed on a first bar end (133) and a bulbous second track head (135b) disposed on a second bar end (134), wherein the first track head (135a) is securely disposed within the cavity of the first track

(123), and wherein the second track head (135b) is securely disposed within the cavity of the second track (124);
e) a bottom support bar (132) extending from the first guide rail (121) to the second guide rail (122);
f) a rollable shade (140) comprising a shade top edge (141), a shade bottom edge (142), a shade first side (143), and a shade second side (144), wherein the shade top edge (141) is attached to the telescoping top support bar (131), wherein the shade bottom edge (142) is attached to the bottom support bar (132), wherein the shade first side (143) is adjacent to the first guide rail (121) and the shade second side (144) is adjacent to the second guide rail (122), wherein the shade (140) is biased to coil around the telescoping top support bar (131), wherein the shade (140) is constructed from a material that will automatically coil around the telescoping top support bar (131);
g) a rotatable first spool (152) extending from a first motor (151) enclosed within a first motor housing (150), and a rotatable second spool (162) extending from second motor (161) enclosed within a second motor housing (160);
h) a coilable, semi-rigid first cable (153) having a first cable first end (154a) attached to the first track head (135a) and a first cable second end (154b) attached to the rotatable first spool (152);
i) a coilable, semi-rigid second cable (163) having a second cable first end (164a) attached to the second track head (135b) and a second cable second end (164b) attached to the rotatable second spool (162); and
j) an up/down switch (170);
wherein when the switch is triggered to move the shade (140) in an upward motion, the first motor (151) rotates the first spool (152) and the second motor (161) rotates the second spool (162) such that the first cable (153) and the second cable (163) uncoil from the first spool (152) and the second spool (162) respectively, wherein the first cable (153) and second cable (163) extend upwardly to push the first track head (135a) and the second track head (135b) along the first track (123) and second track (124) respectively, and wherein the upward movement of the first track head (135a) and the second track head (135b) uncoils the rollable shade (140) from the telescoping top support bar (131); and
wherein when the switch is triggered to move the shade (140) in a downward motion, the first motor (151) rotates the first spool (152) and the second motor (161) rotates the second spool (162) such that the first cable (153) and the second cable (163) retract and coil around the first spool (152) and the second spool (162) respectively, wherein the first cable (153) and second cable (163) retract to pull the first track head (135a) and the second track head (135b) downwardly along the first track (123) and second track (124) respectively, and wherein the downward movement of the first track head (135a) and the second track head (135b) coils the rollable shade (140) around the telescoping top support bar (131).

2. A vehicle window shade system (100) consisting of:
a) a vehicle window frame (110) consisting of a first side (111), an opposing second side (112), a top side (113) and a bottom side (114);
b) a first guide rail (121) attached to the frame first side (111) and a second guide rail (122) attached to the frame second side (112);
c) a first track (123) consisting of an elongated cavity disposed within the first guide rail (121) and a second track (124) consisting of an elongated cavity disposed within the second guide rail (122);
d) a telescoping top support bar (131) consisting of a bulbous first track head (135a) disposed on a first bar end (133) and a bulbous second track head (135b) disposed on a second bar end (134), wherein the first track head (135a) is securely disposed within the cavity of the first track (123), and wherein the second track head (135b) is securely disposed within the cavity of the second track (124);
e) a bottom support bar (132) extending from the first guide rail (121) to the second guide rail (122);
f) a rollable shade (140) consisting of a shade top edge (141), a shade bottom edge (142), a shade first side (143), and a shade second side (144), wherein the shade top edge (141) is attached to the telescoping top support bar (131), wherein the shade bottom edge (142) is attached to the bottom support bar (132), wherein the shade first side (143) is adjacent to the first guide rail (121) and the shade second side (144) is adjacent to the second guide rail (122), wherein the shade (140) is biased to coil around the telescoping top support bar (131), wherein the shade (140) is constructed from a material that will automatically coil around the telescoping top support bar (131);
g) a rotatable first spool (152) extending from a first motor (151) enclosed within a first motor housing (150), and a rotatable second spool (162) extending from second motor (161) enclosed within a second motor housing (160);
h) a coilable, semi-rigid first cable (153) consisting of a first cable first end (154a) attached to the first track head (135a) and a first cable second end (154b) attached to the rotatable first spool (152);
i) a coilable, semi-rigid second cable (163) consisting of a second cable first end (164a) attached to the second track head (135b) and a second cable second end (164b) attached to the rotatable second spool (162); and
j) an up/down switch (170);
wherein when the switch is triggered to move the shade (140) in an upward motion, the first motor (151) rotates the first spool (152) and the second motor (161) rotates the second spool (162) such that the first cable (153) and the second cable (163) uncoil from the first spool (152) and the second spool (162) respectively, wherein the first cable (153) and second cable (163) extend upwardly to push the first track head (135a) and the second track head (135b) along the first track (123) and second track (124) respectively, and wherein the upward movement of the first track head (135a) and the second track head (135b) uncoils the rollable shade (140) from the telescoping top support bar (131); and
wherein when the switch is triggered to move the shade (140) in a downward motion, the first motor (151) rotates the first spool (152) and the second motor (161) rotates the second spool (162) such that the first cable (153) and the second cable (163) retract and coil around the first spool (152) and the second spool (162) respectively, wherein the first cable (153) and second cable (163) retract to pull the first track head (135a) and the second track head (135b) downwardly along the first track (123) and second track (124) respectively, and wherein the downward movement of the first track head (135a) and the second track head (135b) coils the rollable shade (140) around the telescoping top support bar (131).

* * * * *